US012658008B2

(12) United States Patent     (10) Patent No.:   US 12,658,008 B2

Brady            (45) Date of Patent:     Jun. 16, 2026

---

(54) GAME SYSTEMS AND METHODS

(71) Applicant: Aaron Brady, Riverside, CA (US)

(72) Inventor: Aaron Brady, Riverside, CA (US)

( * ) Notice: Subject to any disclaimer, the term of this patent is extended or adjusted under 35 U.S.C. 154(b) by 275 days.

(21) Appl. No.: 18/385,120

(22) Filed: Oct. 30, 2023

(65) Prior Publication Data

US 2024/0153358 A1     May 9, 2024

Related U.S. Application Data

(60) Provisional application No. 63/422,154, filed on Nov. 3, 2022.

(51) Int. Cl.
    *G07F 17/32*        (2006.01)
    *G06F 7/58*         (2006.01)

(52) U.S. Cl.
    CPC .......... *G07F 17/3293* (2013.01); *G06F 7/588* (2013.01); *G07F 17/3209* (2013.01); *G07F 17/3211* (2013.01)

(58) Field of Classification Search
    CPC ............. G07F 17/3293; G07F 17/3209; G07F 17/3211; G06F 7/588
    See application file for complete search history.

(56) References Cited

U.S. PATENT DOCUMENTS

| | | | |
|---|---|---|---|
| 7,918,724 B2 * | 4/2011 | Walker ...................... | A63F 1/00 |
| | | | 273/292 |
| 2005/0037834 A1 * | 2/2005 | Stern ......................... | A63F 1/02 |
| | | | 463/16 |
| 2009/0082079 A1 * | 3/2009 | Kuhn ...................... | G07F 17/32 |
| | | | 463/13 |
| 2009/0253503 A1 * | 10/2009 | Krise ................... | G07F 17/322 |
| | | | 463/31 |
| 2010/0244382 A1 * | 9/2010 | Snow .................. | G07F 17/3211 |
| | | | 273/149 R |
| 2015/0265909 A1 * | 9/2015 | Schubert .................. | A63F 1/14 |
| | | | 273/149 R |
| 2024/0325869 A1 * | 10/2024 | Evans ....................... | A63F 1/04 |

* cited by examiner

*Primary Examiner* — Ronald Laneau

(74) *Attorney, Agent, or Firm* — SNELL & WILMER L.L.P.

(57)          ABSTRACT

The method can comprise displaying at least two digital original cards assigned to a player on a graphical user interface (GUI) displayed on a display screen, with each of the at least two digital original cards displaying a respective value; displaying at least two digital hit cards on the GUI, wherein the at least two digital hit cards are presented hiding respective values of the at least two digital hit cards; receiving a selection of a first digital hit card of the at least two digital hit cards; presenting the first digital hit card to show a first digital hit card value associated with the first digital hit card in response to receiving the selection of the first digital hit card; and/or assigning the first digital hit card to the player.

14 Claims, 7 Drawing Sheets

600

Present at least two original cards for a player — 602

Present at least two dealer cards for a dealer — 604

Present a plurality of hit cards in a hit card space — 606

Show a value of a selected hit card — 608

Assign the hit card to a player — 610

Determine a game outcome — 612

700

Display at least two original cards on a graphical user interface (GUI) — 702

Display at least two hit cards on the GUI — 704

Receive a selection of a hit card — 706

Present value of selected hit card — 708

Assign the selected hit card to the player. — 710

Determine player score — 712

Facilitate dealer hand — 714

Determine a game outcome — 716

GAME SYSTEMS AND METHODS

CROSS-REFERENCE TO RELATED APPLICATIONS

This application is a nonprovisional of, and claims priority to and the benefit of, U.S. Provisional Patent Application No. 63/422,154, filed Nov. 3, 2022 and entitled "GAME SYSTEMS AND METHODS," which is hereby incorporated by reference herein.

FIELD

The present disclosure relates generally to games and gaming systems and methods.

BACKGROUND

Card games are commonly played in casinos for players to wager and win money or credits. Players, however, can quickly become tired of, or lose interest in, a game. Casinos are always seeking new and innovative ways to interest players into participating in games and as well as keeping players interested to play for longer periods of time.

SUMMARY

A system, method, and article of manufacture (collectively, "the system") are disclosed relating to game systems and methods. In various embodiments, the system can be configured to perform operations including displaying, by a processor, at least two digital original cards assigned to a player on a graphical user interface (GUI) displayed on a display screen, with each of the at least two digital original cards displaying a respective value; displaying, by the processor, at least two digital hit cards on the GUI, wherein the at least two digital hit cards are presented hiding respective values of the at least two digital hit cards; receiving, by the processor, a selection of a first digital hit card of the at least two digital hit cards; presenting, by the processor, the first digital hit card to show a first digital hit card value associated with the first digital hit card in response to receiving the selection of the first digital hit card; and/or assigning, by the processor, the first digital hit card to the player. In various examples, the operations can further comprise receiving, by the processor, an input from a first hit sensor, wherein the first hit sensor is associated with the first digital hit card, wherein the selection of the first hit card occurs in response to the input from the first hit sensor. In various examples, the operations can further comprise determining, by the processor, a player score based on the respective values of the at least two digital original cards and the first digital hit card. In various examples, the operations can further comprise receiving, by the processor, a second selection of a second digital hit card of the at least two digital hit cards; presenting, by the processor, the second digital hit card to show a second digital hit card value associated with the second digital hit card; and/or assigning, by the processor, the second digital hit card to the player. In various examples, the operations can further comprise selecting, by the processor and a random number generator, the at least two original cards and the at least two digital hit cards randomly and/or selecting, by the processor and a random number generator, a value of each of the at least two original cards and the at least two digital hit cards randomly.

In various examples, a system can comprise a gaming machine comprising a display screen; a processor operably connected to the gaming machine; and/or a tangible non-transitory computer readable memory configured to communicate with the processor, the tangible non-transitory computer readable memory having instructions stored thereon that, in response to execution by the processor cause the processor to perform operations such as those discussed herein. In various examples, the system can further comprise at least two hit buttons, wherein each hit button of the at least two hit buttons is associated with a hit card of the at least two digital hit cards. In various examples, the first hit button can be positioned on the gaming machine in a first button position corresponding with a position of the first digital hit card displayed on the GUI, and a second hit button of the at least two hit buttons can be positioned on the gaming machine in a second button position corresponding with a position of the second digital hit card displayed on the GUI. In various examples, the system can further comprise a random number generator configured to randomize digital cards presented by the processor based on a standard 52-card deck.

In various examples, a method of playing a card game can comprise presenting at least two original cards to a player card zone on a gaming table; presenting at least two dealer cards to a dealer card zone on the gaming table; presenting a plurality of hit cards from the card stack in a hit card space of the gaming table, wherein the at least two hit cards are placed face-down, hiding a value of each of the plurality of hit cards; showing a first value of a first hit card of the plurality of hit cards in response to a player selecting the first hit card; assigning the first hit card in the player card zone in response to the player selecting the first hit card; and/or determining a game outcome based on the at least two original cards and the first hit card.

The gaming table can comprise a plurality of hit zones, wherein each hit zone of the plurality of hit zones is associated with a respective hit card of the plurality of hit cards and positioned corresponding to the respective hit card. The first hit card can be selected by the player by indicating a first hit zone of the plurality of hit zones associated with the first hit card. In various examples, the plurality of hit zones can be disposed in a nonlinear pattern. In various examples, each of the plurality of hit zones can comprise a hit sensor, wherein indicating the first hit zone comprises triggering a first hit sensor comprised in the first hit zone. In various examples, indicating the first hit zone can comprise pressing a first hit sensor comprised in the first hit zone. In various examples, in response to triggering the first sensor, the method can further comprise illuminating a first light associated with the first sensor. In various examples, the method can further comprise showing a second value of a second hit card of the plurality of hit cards, wherein the determining the game outcome is further based on the second value of the second hit card.

BRIEF DESCRIPTION OF THE DRAWINGS

The subject matter of the present disclosure is particularly pointed out and distinctly claimed in the concluding portion of the specification. A more complete understanding of the present disclosure, however, can best be obtained by referring to the detailed description and claims when considered in connection with the drawing figures. In the figures, like referenced numerals can refer to like parts throughout the different figures unless otherwise specified.

DETAILED DESCRIPTION

Figure 1:
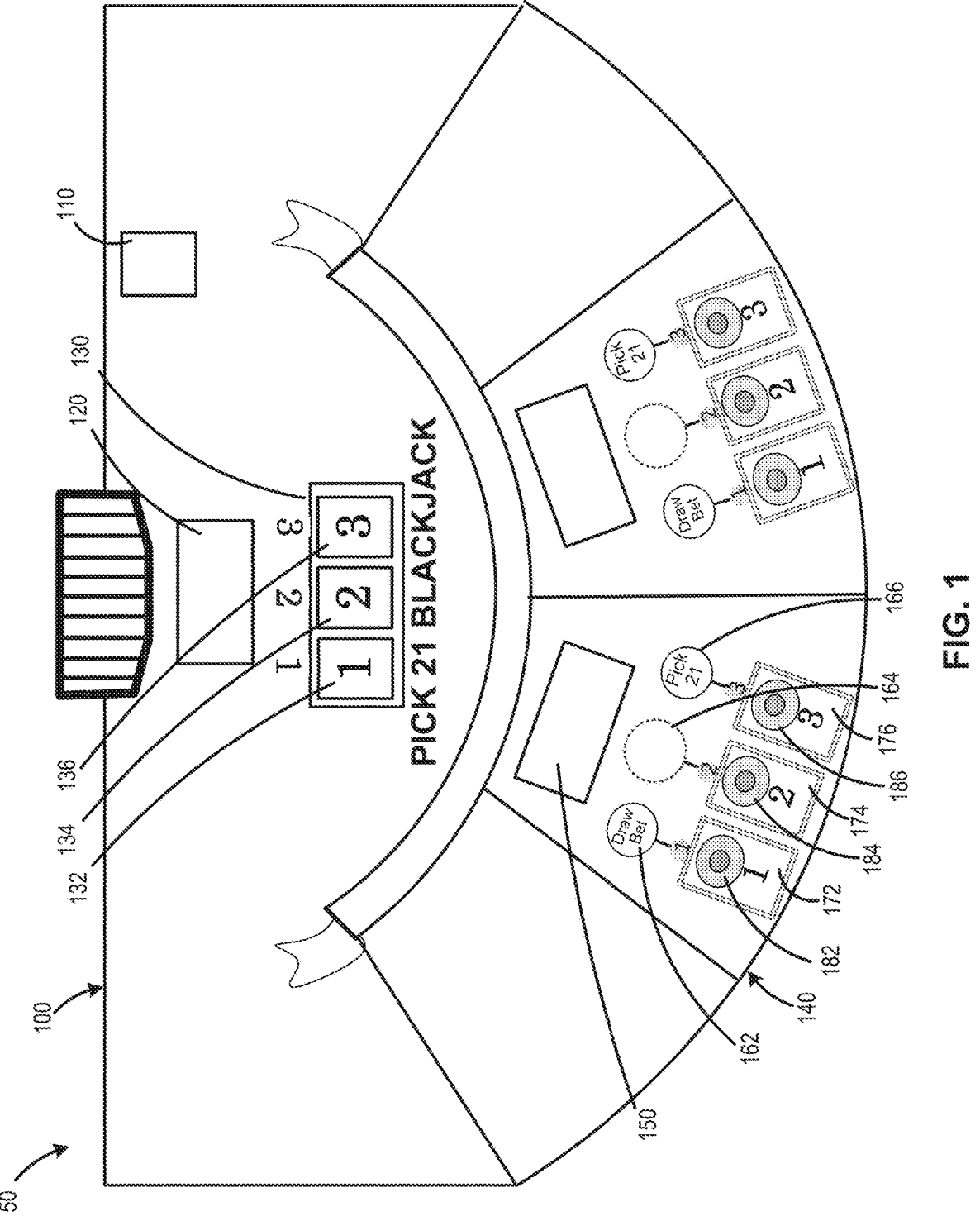
FIG. 1 illustrates a gaming table, in accordance with various examples.

The detailed description of various examples herein makes reference to the accompanying drawings, which show the various examples by way of illustration. While these various examples are described in sufficient detail to enable those skilled in the art to practice the disclosure, it should be understood that other examples can be realized and that logical, compositional, and mechanical changes can be made without departing from the spirit and scope of the disclosure. Thus, the detailed description herein is presented for purposes of illustration only and not of limitation. For example, the steps recited in any of the method or process descriptions can be executed in any combination or order and are not limited to the combination and order presented. Moreover, any of the functions or steps can be outsourced to or performed by one or more third parties. Furthermore, any reference to singular includes plural examples, and any reference to more than one component or step can include a singular component or step. Also, any reference to attached, fixed, connected, or the like can include permanent, removable, temporary, partial, full, and/or any other possible attachment option.

Several (or different) elements discussed below, and/or claimed, are described as being "coupled", "in communication with", or "configured to be in communication with." This terminology is intended to be non-limiting, and where appropriate, be interpreted to include, without limitation, wired and/or wireless communication using any one or a plurality of a suitable protocols, as well as communication methods that are constantly maintained, are made on a periodic basis, and/or made or initiated on an as needed basis.

The methodologies described herein can be implemented in any suitable manner depending upon applications according to particular examples. For example, such methodologies can be implemented in hardware, firmware, software, or combinations thereof. In a hardware implementation, for example, the controller or processing unit can be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Unless specifically stated otherwise, as apparent from the discussion herein, it is appreciated that throughout this specification, discussions utilizing terms such as "processing," "computing," "calculating," "determining" or the like refer to actions or processes of a processor, such as a processor on a special purpose computer or a similar special purpose electronic computing device. In the context of this description, therefore, a special purpose computer or a similar special purpose electronic computing device is capable of manipulating or transforming signals, typically represented as physical electronic or magnetic quantities within memories, registers, or other information storage devices, transmission devices, or display screens of the special purpose computer or similar special purpose electronic computing device.

For clarity in discussing the various functions of the system, multiple computers and/or servers are discussed as performing different functions. These different computers (or servers) can, however, be implemented in multiple different ways such as modules within a single computer, as nodes of a computer system, etc. The functions performed by the system (or nodes or modules) can be centralized or distributed in any suitable manner across the system and its components, regardless of the location of specific hardware. Furthermore, specific components of the system can be referenced using functional terminology in their names. The function terminology is used solely for purposes of naming convention and to distinguish one element from another in the following discussion. Unless otherwise specified, the name of an element conveys no specific functionality to the element or component. It should be appreciated that, in various examples, the software, hardware, and associated components of the system can be programmed and configured to implement one or more examples described herein. It should also be appreciated that the various aspects of the system can be exemplified as software, modules, nodes, etc., of a computer or server.

The game systems and methods described herein can be implemented in various configurations for games, gaming machines, gaming devices, or gaming systems, including but not limited to: (1) a dedicated gaming machine, gaming device, or gaming system wherein the computerized instructions for controlling any games (which can be provided by the gaming machine or gaming device) are provided with the gaming machine or gaming device prior to delivery to a gaming establishment; (2) a changeable gaming machine, gaming device, or gaming system wherein the computerized instructions for controlling any games (which can be provided by the gaming machine or gaming device) are downloadable to the gaming machine or gaming device through a data network; and/or (3) a physical gaming table utilizing physical playing cards. In various examples, the computerized instructions for controlling any games are executed by at least one central server, central controller, or remote host. In such "thin client" examples, the central server remotely controls any games or game systems (or other suitable interfaces) and the gaming system is utilized to operate and/or display such games (or suitable interfaces) and/or receive one or more inputs or commands from a player. In various examples, the computerized instructions for controlling any games are communicated from the central server, central controller, or remote host to a gaming device local processor and memory devices. In such "thick client" examples, the gaming device local processor executes the communicated computerized instructions to control any games (or other suitable interfaces) provided to a player.

In accordance with various examples, the game systems and methods described herein are configured to provide card games to a player. A game system can be a system for playing card games, such as blackjack or a variant of a casino-style card game. A card stack utilized in a game system can be a virtual computer-based card stack or a physical card stack containing one or more decks of playing cards (e.g., standard 52-card playing card decks). A game system having a virtual playing card stack can comprise or be in communication with a random number generator to randomize the cards in the card stack.

In a card game, such as blackjack, a player can place an initial bet and/or several side bets. Generally, bets are placed at the beginning of each hand, but there are some circumstances where the bet can be placed during the hand. In various examples, each of the cards are assigned a value indicated on the card (e.g., card values can be commensurate with those assigned in a standard game of blackjack, wherein numbered cards have a value equal to the number (e.g., 2s, 3s, 4s, 5s, 6s, 7s, 8s, 9s, and 10s each have a value of 2, 3, 4, 5, 6, 7, 8, 9, and 10, respectively), face cards have a value of ten, and aces have a value of one or eleven). Each player receives cards. For example, a dealer can deal cards to the player(s), and/or a gaming machine can assign and/or display cards to the one or more players. Each player can be initially distributed two original player cards, face-up (i.e., with the card value presented or available to the player). The dealer can receive two original dealer cards (e.g., the dealer can receive two cards, only one of which may be face-up, i.e., with the card value presented or available to the player). In response to receiving the original cards, the player can select whether to receive an additional card (a hit card). In response to the player electing to receive a hit card, two or more additional cards (hit cards) can be placed face-down (i.e., with the card value hidden from the player) in a hit card space of the table or gaming interface. In various examples, hit cards can be placed in a hit card space before or regardless of whether a player elects to receive a hit card.

In various examples, a card or gaming table can comprise one or more player zones, corresponding to where a player can sit, and at which a player can play the respective game. A player zone can comprise two or more hit zones (e.g., spaces on a table, buttons, sensors, and/or the like), wherein each hit zone corresponds to one of the hit cards. The player can select a card from the hit card space based on a selection of, or by selecting, a corresponding hit zone. For example, the player can indicate a hit zone on a table (e.g., physically tap, point to, place the player's hand over, press a button comprised in, and/or trigger a sensor comprised in a hit zone) corresponding to the selected hit card. In response to selection of a hit card, the value of the selected hit card can be revealed or presented and assigned to the player or player's hand. The player can elect to receive any number of additional hit cards, or stay with the current cards assigned to the player.

In various examples, if the player elects to receive an additional hit card(s), the player can select the additional hit card(s) from the presently presented hit cards remaining in the hit card space by indicating a hit zone corresponding to the selected hit card. In various examples, after selection of a hit card from the hit card space, the remaining hit cards in the hit card space can be discarded, and new hit cards can be presented (e.g., in the same number as the original hit card presentation, in the hit card space facedown). The player can then select a second hit card from the hit card space by selecting a hit zone that corresponds to the selected hit card in the hit card space. In various examples, if the player elects to receive an additional hit card(s), the number of hit cards in the hit card space can be replenished to the original number of presented hit cards, and then the player can select therefrom by indicating a corresponding hit zone. Following the conclusion of a players turn, additional players can also repeat the process. Hit cards in the hit card space can be replenished and/or replaced with new hit cards in response to changing turns to another player, or the next player can select from hit cards in the hit card space remaining from the previous player's turn (e.g., if there are three hit cards originally placed in the hit card space, and a previous player selects one hit card, the next player can select from the remaining two hit cards, if desired). In response to the conclusion of all of the players' turns (e.g., each player is done hitting (i.e., receiving additional cards to their hands), has stayed, or has exceeded a threshold value (i.e., busting)), the dealer can have the opportunity to select whether to receive a hit card. If the dealer selects to receive a hit card, the dealer can take a hit card directly from the card stack, from the hit card space similar to any of the examples of players selecting hit cards, or in any other suitable manner.

In a card game, such as blackjack, a player receive cards and can play against another player(s) and/or a dealer. Card games can be played at a physical table or electronic table, gaming machine, or other gaming system including through an application on a personal computer or device. The dealer, or gaming system can present (or "deal") cards to players and to the dealer.

In a card game, such as blackjack, a player plays against a dealer. The player can place an initial bet, also referred to as a main bet, and one or more side bets. The dealer can present a first card to the player card zone of each player, then a first card to the dealer in the dealer card zone. The first card presented to the dealer card zone is placed face down. The dealer can then present a second card to the player card zone of each player. Both cards presented to the player card zone are presented face up. The dealer can then present a second dealer card in the dealer card zone, which can be face up. In various examples, in a game of blackjack, the object of the game is for the player to beat the dealer's hand. To beat the dealer's hand, the sum of cards assigned to the player in the player card zone must be closer to 21, without exceeding 21, than the sum of cards assigned to the dealer, or must be less than or equal to 21 if the sum of cards assigned to the dealer exceeds 21. During a "hand" or "round," after the player receives their two original cards to the player card zone, the player can choose to receive an additional card(s) (referred to as "hitting"), or to keep the two originally assigned cards and not receive any additional cards (referred to as "standing" or "staying"). In various examples, the player can choose to double their bet and receive one additional card (referred to as "doubling down"). In various examples, where the two original cards assigned to the player are matching in value or suit (what is referred to in blackjack as "pairs"), the player can elect to divide their two original cards into two hands of cards (referred to as "splitting").

Once the player elects to stay (or busts or receives an additional card after doubling down), the round moves to the next player if there is another player. Once all of the players have either chosen to stay, busted, or received an additional card after doubling down (i.e., after all player turns are complete), it is the dealer's turn. The dealer begins their turn by checking if they have blackjack. If the dealer has blackjack, the dealer wins the hand or round.

In various examples, the dealer can only choose to hit to receive an additional card or stay. In various examples, when the sum of the cards in the dealer card zone is less than a threshold value (e.g., 16), the dealer must hit and receive an additional card. The goal is for each player and the dealer to be assigned cards so that the sum of the cards is closest to 21 without exceeding 21.

In various examples, a player can elect to make a main bet and/or one or more side bets. A main bet and/or side bet can be selected when a player places chips in the appropriate bet zone corresponding to the respective bet. A main bet and/or side bet can be selected when a player selects a bet on a gaming machine or digital display (e.g., by pressing a button, or selecting a digital button on a display screen (e.g., by selecting the button with a mouse, or by touching the button on a touch screen)).

In various examples, a side bet can be a pick 21 bet. A pick 21 bet can allow the player to receive a side bet payout when the sum of the cards assigned to the player (e.g., in the player card zone) is equal to 21. In various examples, another requirement is that the total number of cards assigned to the player is equal to 3 or more. For example, where the sum of the cards assigned to the player is equal to 21, and the total number of cards assigned to a player is equal to three, the player can receive a side bet payout of six to one.

In various examples, a side bet can be a draw bet. A draw bet can allow the player to receive a side bet payout when the sum of the cards in the player card zone is less than 22 and greater than the sum of cards assigned to the dealer card zone, and the total number of cards assigned to the player is equal to 3 or more, or 4 or more. For example, where the total number of cards assigned to the player is equal to 3, the player can receive a side bet payout of six to one. Meaning, the player can receive six times the value of the bet placed in the draw bet side bet.

In various examples, the gaming system or gaming machine can include one or more hit sensors. Each hit sensor can be included in a respective hit zone. Each of the hit sensors can correspond to a respective hit card in the hit card space. For example, a first hit sensor can be included in a first hit zone, the first hit sensor corresponding to the first hit card (e.g., the first hit sensor and the first hit zone can be the left-most hit sensor and hit zone, corresponding to the left-most positioned hit card in the hit card space, from a player's perspective). A player can select a hit card from the hit card space by causing the respective hit sensor to activate or sense and receive an input (e.g., by pressing or touching or waiving over a hit sensor corresponding to the respective hit card). The selected hit card can then be assigned to the player (e.g., placed in the player card zone face-up). In various examples, a hit sensor can comprise a motion sensor or heat sensor to detect movement or touch by a player on or around the hit sensor, and/or a button which a player can select or press.

In various examples, gaming machine or table can include a dealer side and a player side. The dealer can sit or stand on the dealer side and the player can sit or stand on the opposite side of the dealer side. In a gaming machine or device, a dealer may not be present, however the gaming machine can have a dealer side on one area of the digital display or graphical user interface (GUI) and a player area on a separate area of the digital display or GUI. In various examples, a dealer card zone can be proximate and/or adjacent to a dealer or an edge of the table or GUI on which a dealer would be present. A player zone can be proximate and/or adjacent to a player. The player zone can include a player card zone, a plurality of bet spaces, and/or a plurality of hit zones. In various examples, the hit zones are closer in proximity to a player than the plurality of bet zones (i.e., bet zones can be disposed between the hit zones and the dealer side). The player card zone can be in closer in proximity to the dealer than the hit zones and bet zones for the dealer to deal cards into the player card zone. The dealer can also be in proximity to the bet zone to give and take chips in the bet zones.

In various examples, gaming device or table can include a plurality of hit card spaces and a plurality of hit zones. Each hit zone can include a hit sensor. Each of the hit card spaces can correspond to a hit zone. In various examples, one hit card is displayed in each of the hit card spaces. For example, a dealer can deal a card to each of the hit card spaces or a gaming device can display a hit card in each of the hit card spaces on a digital display. The hit cards can be displayed in the hit card spaces facedown. In various examples, a hit sensor can be positioned on the gaming device or table in a first sensor position corresponding with a hit card displayed on a GUI or table. For example, a hit sensor can be positioned next to or within a hit zone, wherein the hit zone is the middle of three hit zones, which corresponds to a middle hit card in the hit card space or a middle of three hit card spaces.

As illustrated in FIG. 1, in various examples, a game system 50 can comprise a card table 100 and a card stack 110. In various examples, card table 100 can comprise a dealer card zone 120, a hit card space 130, and a player zone 140. In various examples, the game system 50 can comprise or resemble a gaming table or a blackjack table.

In various examples, the card stack 110 can include a standard deck of cards or other variants. The card stack 110 can comprise two or more decks of cards. The card stack 110 can be used to deal cards to different areas of the table. The dealer card zone 120 can be in communication with the card stack 110, such that cards can be transferred from card stack 110 to dealer card zone 120. A dealer can deal the cards from the card stack 110 to suitable areas, zones, or spaces on card table 100, e.g., to the dealer card zone 120, the hit card space 130, and the player card zone 150. The dealer card zone 120, the hit card space 130, and the player card zone 150 can receive cards from the card stack 110.

In various embodiments, the dealer card zone 120 can be proximate and/or adjacent to the hit card space 130. The dealer card zone 120 can be proximate and/or adjacent to a dealer positioned at the card table 100. In various examples, a dealer can stand on the side of the table closest to the dealer card zone 120, so the dealer can easily deal cards to the dealer card zone 120.

In various embodiments, the hit card space 130 can be proximate and/or adjacent to the dealer card zone 120 (e.g., there are no other components of card table 100 between dealer card zone 120 and hit card space 130). The hit card space 130 can receive one or multiple cards from the card stack 110. For example, the hit card space 130 can include a first hit card space 132, a second hit card space 134, and a third hit card space 136, wherein each of the first hit card space 132, the second hit card space 134, and the third hit card space 136 can be configured to receive a hit card from the card stack 110. In various examples, hit card space 130 can be an open space to receive hit cards in any suitable number or arrangement. In various examples, the cards placed in the hit card space 130 can be presented face-down (i.e., with the respective number or value of each hit card being hidden from a player's view).

With continued reference to FIG. 1, in various examples, the player zone 140 can include a player card zone 150, one or more bet zones 162, 164, 166, and a plurality of hit zones 172, 174, and 176. The player card zone 150 can be proximate to the one or more bet zones 162, 164, 166. The plurality of hit zones 172, 174, and 176 can be proximate to the one or more bet zones 162, 164, 166 and can be most proximate an edge of the player zone 140 and/or table 100 at which the respective player can be positioned. The one or more bet zones 162, 164, 166 can be in closer proximity to the player card zone 150 than the plurality of hit zones 172, 174, and 176.

In various examples, the player card zone 150 can be proximate to the hit card space 130. The player card zone 150 can be configured to receive cards from the card stack 110. The player card zone 150 can include the player's hand of cards. The player card zone 150 can receive cards from the card stack 110 and/or the hit card space 130. The player card zone 150 can be configured to receive two cards from the card stack 110, and one or more cards from the hit card space 130 in response to the respective player electing to hit during a game. The player card zone 150 can be configured to display the cards face-up.

In various examples, the one or more bet zones 162, 164, and 166 can include a first bet zone 162, a second bet zone 164, and a third bet zone 166. The one or more bet zones 162, 164, and 166 can include a main bet and/or one or more side bets. For example, a bet zone can include a pick-21 bet and/or a draw bet. The first bet zone 162, the second bet zone 164, and the third bet zone 166 can be arranged in a substantially linear arrangement in the player zone 140. The bet zones can be configured to receive a bet from a player (e.g., betting chips disposed in the bet zones).

With continued reference to FIG. 1, the player zone 140 can include a plurality of hit zones 172, 174, and 176. For example, the plurality of hit zones 172, 174, and 176 can include a first hit zone 172, a second hit zone 174, and a third hit zone 176. In various examples, the first hit zone 172, the second hit zone 174, and the third hit zone 176 can be arranged in a substantially linear arrangement. For example, the first hit zone 172, the second hit zone 174, and the third hit zone 176 can each have a center point, and the center point of each of the first hit zone 172, the second hit zone 174, and the third hit zone 176 can be disposed along a line. In various examples, the position of each of the hit zones 172, 174, and 176 correspond with a respective hit card within the hit card space. For example, the position of each of the hit zones 172, 174, and 176 can correspond with hit card spaces 132, 134, 136. That is, first hit zone 172 corresponds to first hit card space 132 (both are the left-most positions when viewed from player zone 140), second hit zone 174 corresponds to second hit card space 134 (both are the middle positions when viewed from player zone 140), and third hit zone 176 corresponds to third hit card space 136 (both are the right-most positions when viewed from player zone 140). In various examples, the plurality of hit zones 172, 174, 176 can be proximate and/or adjacent to a player at the card table 100. The plurality of hit zones 172, 174, 176 can be proximate and/or adjacent to the one or more bet zones 162, 164, and 166.

In various examples, a player can indicate that he or she would like to hit (i.e., receive a hit card to their hand). In response, multiple hit cards can be presented onto the gaming table (e.g., in hit card space 130). For example, a hit card can be placed facedown in each of the first hit card space 132, second hit card space 134, and third hit card space 136. A player can indicate one of the plurality of hit zones to select a hit card from the hit card space. For example, the player can indicate one of the plurality of hit zones 172, 174, 176 to receive a hit card from the hit card spaces 132, 134, 136, respectively. As a further example, a player can select the first hit zone 172 to receive the hit card from the first hit card space 132. The card from the first hit card space 132 can then be moved to the player card zone 150 or be otherwise assigned to the player.

With continued reference to FIG. 1, in various examples, the plurality of hit zones 172, 174, and 176 can each include a hit sensor 182, 184, 186. For example, the first hit zone 172 can include a first hit sensor 182, the second hit zone 174 can include a second hit sensor 184, and the third hit zone 176 can include a third hit sensor 186. In various examples, each of the hit sensors 182, 184, 186 can correspond to each of the hit zones 172, 174, and 176, respectively. Further, each of the hit sensors 182, 184, 186 can correspond to hit card spaces 132, 134, or 136, respectively, and/or respective hit cards in hit card space 130.

In various examples, the hit sensors 182, 184, 186 can be a button, a physical or push sensor, heat sensor, motion sensor, electronic sensors, physical push buttons, digital buttons or touch screen buttons on a digital display, or other device or area to indicate a selection. For example, a player can tap, press, waive, point to, place a hand or finger over, and/or take any other suitable action over the desired hit zone and/or hit sensor to indicate a selection of a respective hit card to receive. The hit sensor 182, 184, 186 can be arranged in proximity to the player so the player can easily select a hit sensor 182, 184, 186. In various examples, a first hit card space 132 can correspond to a first hit zone 172 and the first hit sensor 182, a second hit card space 134 can correspond to a second hit zone 174 and a second hit sensor 184, and a third hit card space 136 can correspond to a third hit zone 176 and a third hit sensor 186. For example, when a player elects to receive a hit card, a hit card is placed in each of the first hit card space 132, second hit card space 134, and third hit card space 136. The first hit sensor 182 of first hit zone 172, second hit sensor 184 of second hit zone 174, and third hit sensor 186 of third hit zone 176 correspond to the first hit card space 132, second hit card space 134, and third hit card space 136, respectively. For example, in response to a player selecting the first hit sensor 182, the player receives the first hit card from the first hit card space 132, in response to a player selecting second hit sensor 184, the player receives the second hit card from the second hit card space 134, and/or in response to a player selecting the third hit sensor 186, the player receives the third hit card from the third hit card space 136.

Figure 2:
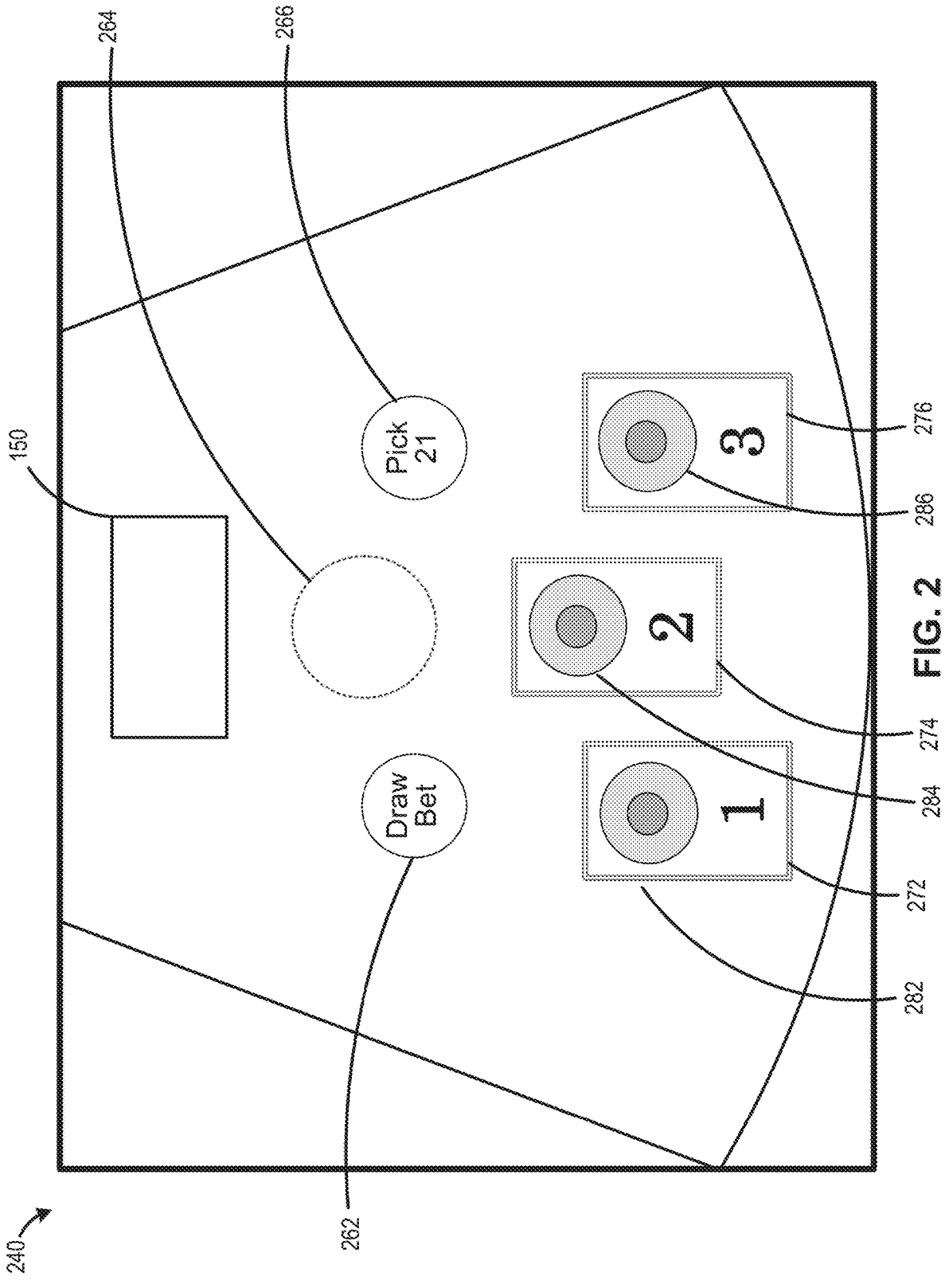
FIG. 2 illustrates a player zone of a gaming system, in accordance with various examples.

As illustrated by FIG. 2, in various examples, a player zone 240 (an example of player zone 140 depicted in FIG. 1) can include a player card zone 150, one or more bet zones 262, 264, and 266 (similar to bet zones 162, 164, and 166 in FIG. 1), and a plurality of hit zones 272, 274, and 276 (similar to hit zones 172, 174, and 176 in FIG. 1). The player card zone 150 can be proximate to the one or more bet zones 262, 264, and 266. The plurality of hit zones 272, 274, 276 can be proximate to the one or more bet zones 262, 264, and 266.

In various examples, the one or more bet zones 262, 264, and 266 can include a first bet zone 262, a second bet zone 264, and a third bet zone 266. The one or more bet zones 262, 264, and 266 can have same or similar functions and characteristics to those of bet zones 162, 164, and 166, as in FIG. 1. For example, the one or more bet zones 262, 264, and 266 can include a main bet or one or more side bets. For example, a bet zone can include a pick-21 bet or a draw bet. In various embodiments, the first bet zone 262, the second bet zone 264, and the third bet zone 266 can be disposed in a nonlinear and/or staggered arrangement in the player zone 240. The first bet zone 262, the second bet zone 264, and the third bet zone 266 can be arranged in a triangular arrangement, with a second bet zone 264 being positioned closer to the player card zone 150 than the first bet zone 262 and a third bet zone 266.

With continued reference to FIG. 2, in various examples, the player zone 240 can include a plurality of hit zones 272, 274, 276. The plurality of hit zones 272, 274, 276 can include a first hit zone 272, a second hit zone 274, and a third hit zone 276. In various example, the plurality of hit zones can be disposed in a nonlinear arrangement. For example, the first hit zone 272 can be staggered in relation to the second hit zone 274, and the second hit zone 274 can be staggered in relation to the third hit zone 276, or the second hit zone 274 can be staggered in relation to the first hit zone 272 and the third hit zone 276. The first hit zone 272, the second hit zone 274, and the third hit zone 276 can be arranged in a triangular arrangement, with a second hit zone 274 being positioned closer to the player card zone 150, or further inward into the table or player zone 240, than the first hit zone 272 and a third hit zone 276. Such a configuration can allow a player's hands to rest behind the second hit zone 274 and between the first hit zone 272 and third hit zone 276. Further, with hit zones in a nonlinear arrangement, a player may be required to more deliberately make a motion to indicate the selected hit zone. Casinos and other gambling establishments may require physical indicators of a player's elected action. Staggered and/or nonlinear arrangements of hit zones can mitigate the risk of a player accidentally indicating a hit zone by mistake, and may facilitate the gambling establishment's visual confirmation of the player indication or election.

The plurality of hit zones 272, 274, and 276 can each include a hit sensor 282, 284, 286. Hit sensors 282, 284, and 286 can be examples of hit sensors 182, 184, and 186 in FIG. 1 discussed herein, having similar structure and/or functionality. Further, with reference to FIG. 1 and continued reference to FIG. 2, in various examples, each of the hit sensors 282, 284, 286 can correspond to each of the hit card spaces 132, 134, 136. For example, when a player selects a hit sensor 282, 284, 286, the player can be assigned a hit card from the corresponding hit card space 132, 134, 136. Each of the hit sensors 282, 284, 286 can be positioned closer to the player than each of the hit card spaces 132, 134, 136. The hit sensor 282, 284, 286 can be arranged in proximity to the player so the player can easily select a hit sensor 282, 284, 286.

In various examples, a gaming system can comprise electronic components and/or be implemented electronically and/or digitally. For example, with reference to FIG. 5, in various examples, a gaming system 500 can include one or more of a processor 510, a memory 520, a video controller 530, a touch screen controller 534, a touch screen 536, a payment device 540, an input device 542, a display screen 544, a sound card 548, and a speaker 550. The memory 520 can include instructions 522 and a random number generator 524.

In various examples, the processor 510 can be in digital and/or electronic communication with the memory 520. The processor 510 can receive instructions from the memory 520. The processor 510 can be in digital or electronic communication with the payment device 540, the input device 542, the display screen 544, the sound card 548, and the speaker 550.

The processor 510 can be a microprocessor, a microcontroller-based platform, a suitable integrated circuit or one or more application-specific integrated circuits (ASIC's). The processor 510 can be in digital communication with, or operable to access or to exchange signals, with at least one data storage or memory 520.

In various examples, the processor 510 can be used to execute the various systems and methods described herein.

The processor 510 can execute the controls of various player inputs described throughout. The processor 510 can be included in a gaming machine (e.g., gaming machine 300, discussed herein), to execute the various steps described herein. The processor 510 of each gaming system 500 can be designed to transmit and receive events, messages, commands, or any other suitable data or signal between the individual gaming machine(s) and a casino management system (e.g., game server). The processor 510 can be operable to execute such communicated events, messages, or commands in conjunction with the operation of a gaming machine. Moreover, the processor(s) of the game server can be designed to transmit and receive events, messages, commands, or any other suitable data or signal between the central server and each of the individual gaming machines. In various examples, the present invention can be employed in a server-based gaming system. In various examples, as described above, one or more gaming machines can be in digital communication with a game server.

In various examples, the memory 520 can store program code and or instructions 522, executable by the processor 510. Memory 520 can also store other data such as image data, event data, player input data, random or pseudo-random number generators, pay-table data or information, and applicable game rules that relate to the play of the casino game. The memory 520 can be a tangible non-transitory computer-readable memory. The memory 520 can include instructions 522. The instructions 522 stored on the memory 520 can allow the gaming system 500 to perform various functions, as described herein. The memory 520 can include a random number generator 524. The random number generator 524 can assist in randomizing the cards in a deck or sleeve or stack of cards. The random number generator 524 can use various methodologies, for example, the random number generator techniques and systems set forth in U.S. Pat. No. 9,336,646 (which is hereby incorporated by reference), or any other random number generator techniques or systems now known or hereinafter devised.

In various examples, the memory 520 can include random access memory (RAM), which can include non-volatile RAM (NVRAM), magnetic RAM (MRAM), ferroelectric RAM (FeRAM), and other forms as commonly understood in the gaming industry. In various examples, memory 520 can include read only memory (ROM). In various embodiments, memory 520 includes flash memory and/or EEPROM (electrically erasable programmable read only memory). It should be appreciated that, any other suitable magnetic, optical, and/or semiconductor memory can operate in conjunction with the gaming system 500.

In various examples, part or all of the program code and/or operating data described above can be stored in a detachable or removable memory 520, including, but not limited to, a suitable cartridge, disk, CD ROM, DVD, or USB memory device. In various examples, part or all of the program code and/or operating data described above can be downloaded to memory 520 through a suitable network.

In various examples, an operator or a player can use such a removable memory 520 in a desktop computer, a laptop computer, a hand-held device, such as a personal digital assistant (PDA), smartphone, or tablet, a portable computing or mobile device, or another computerized platform to implement the present disclosure.

In various examples, gaming system 500 is operable over a wireless network, for example as part of a wireless gaming system. In various examples, gaming system 500 can be, or can be used via, a hand-held device, a personal or mobile device, or any other suitable wireless device that enables a player to play any suitable game at a variety of different locations. In various examples in which gaming system 500 is a hand-held device, a mobile device, or any other suitable wireless device, at least one memory 520 and at least one processor 510 which control the game or other operations of the hand-held device, mobile device, or other suitable wireless device can be located: (a) at the hand-held device, mobile device, or other suitable wireless device; (b) at a central server or central controller; or (c) any suitable combination of the central server or central controller and the hand-held device, mobile device, or other suitable wireless device. It should be appreciated that a gaming device or gaming machine as disclosed herein can be a device that has obtained approval from a regulatory gaming commission or a device that has not obtained approval from a regulatory gaming commission. It should be appreciated that processor 510 and memory 520 can be collectively referred to herein as a "computer" or "controller."

Figure 3:
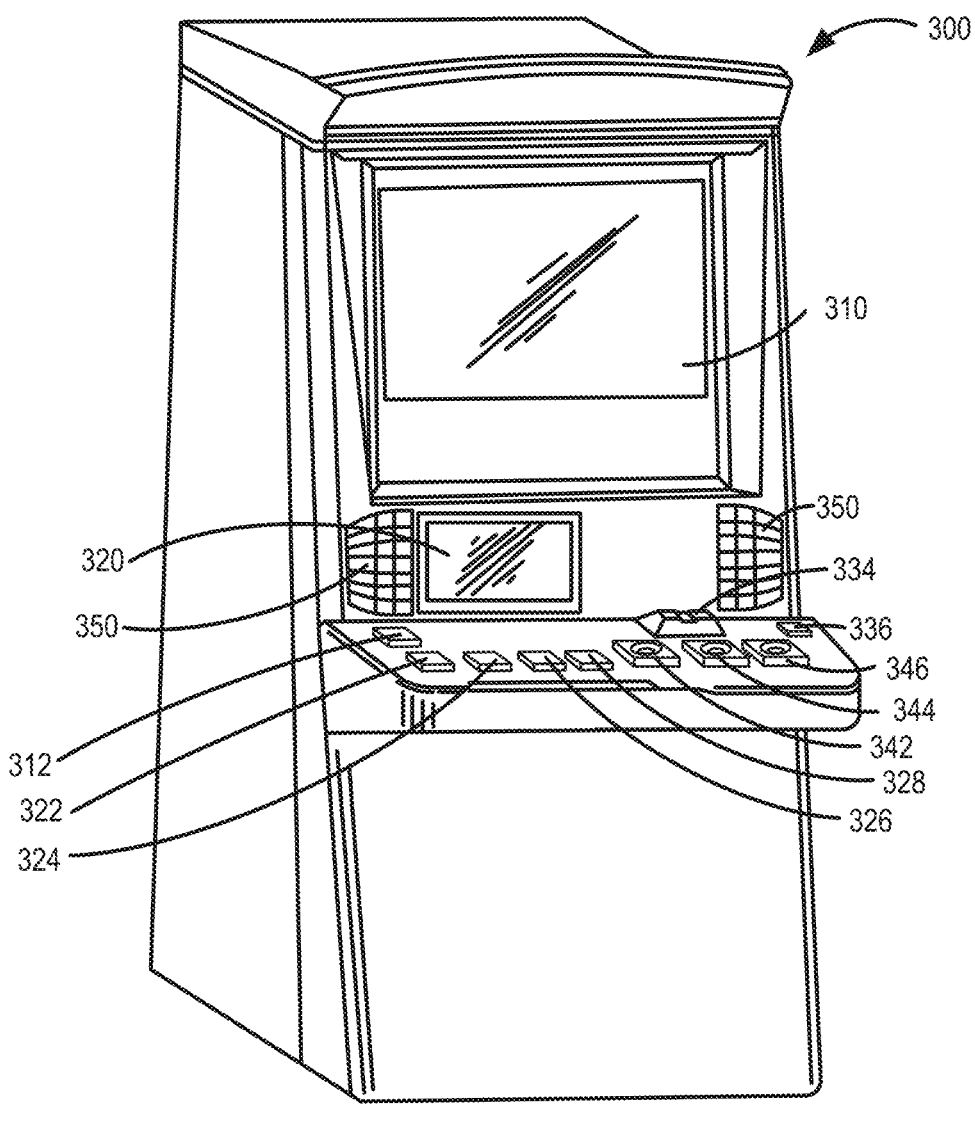
FIG. 3 illustrates a gaming machine, in accordance with various examples.
Figure 4:
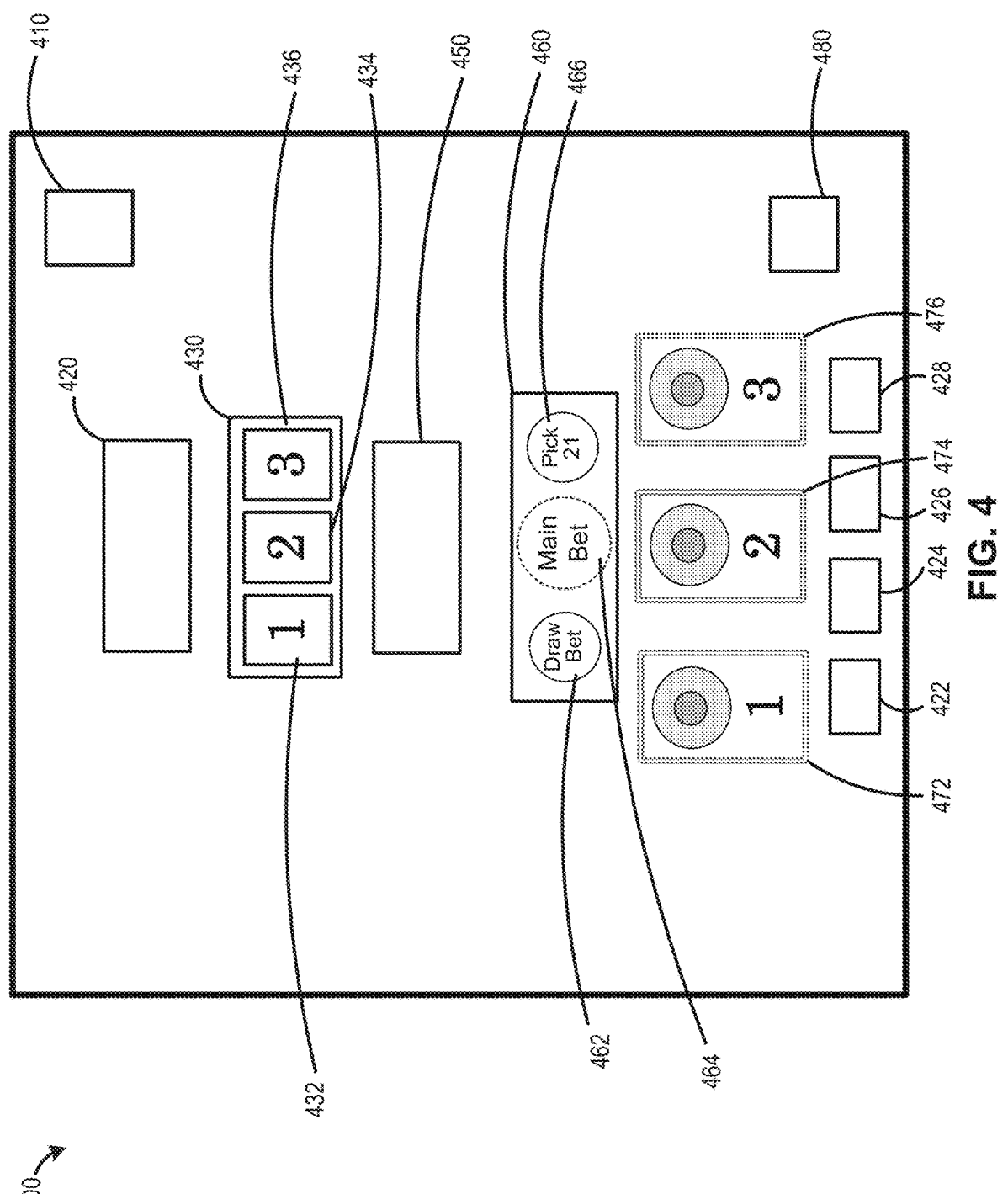
FIG. 4 illustrates a graphical user interface on a display screen of a gaming device, in accordance with various examples.
Figure 5:
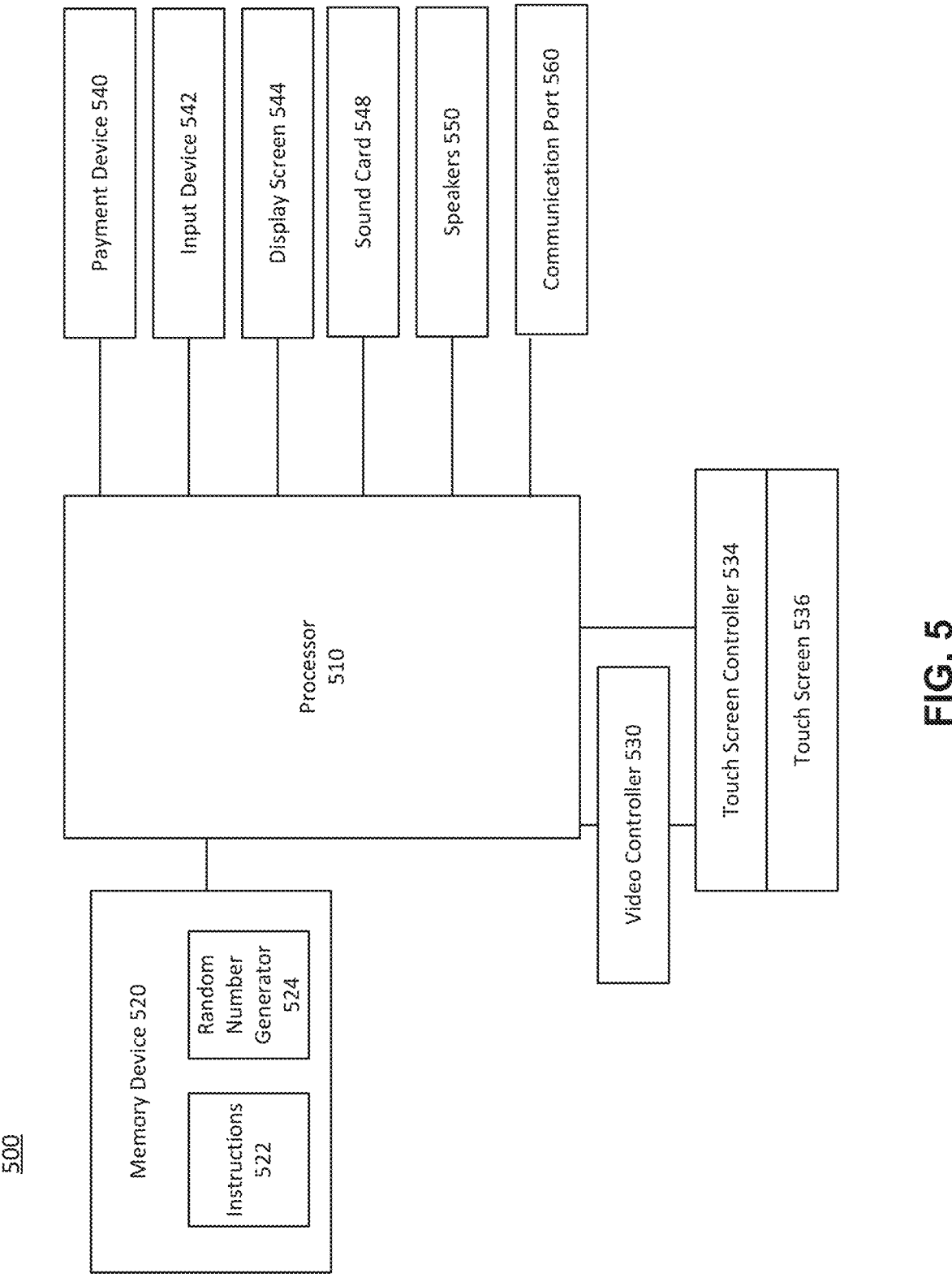
FIG. 5 illustrates a schematic diagram of a gaming system, in accordance with various examples.

In various examples, with reference to FIGS. 3-4 and continued reference to FIG. 5, the memory 520 and processor 510 can reside in the cabinet of a gaming machine 300. The memory 520 can include instructions 522 for operating the various components of the gaming machine 300. The memory 520 can store a digital card stack (e.g., a digital version of card stack 110). The memory 520 can store payout tables associated with the main bet and various side bets.

In various examples, the memory 520 can have instructions stored thereon that in response to execution by the processor 510 cause the processor to perform various operations described throughout.

With reference to FIG. 5, the gaming system can include a video controller 530, touch screen controller 534, touch screen 536, and/or input device 542 in digital communication with the processor 510. In various examples, the input device 542 can be a touch screen 536 coupled with a touch screen controller 534 or some other touch-sensitive display overlay to allow for player interaction with the images on a display screen 544 (e.g., display screens 310 or 320 on gaming machine 300). Touchscreen 536 and/or touch-screen controller 534 can be coupled to a video controller 530. With further reference to FIGS. 3 and 4, a player can make decisions and input signals into gaming machine 300 by touching touch screen 536 at the appropriate locations. One such input device 542 can be a conventional touchscreen button panel.

In various examples, the gaming system 500 can include a payment device 540 in communication with processor 510. Payment device 540 can accept a physical item and/or signal associated with a monetary value and can establish or increase a credit balance for the player based on the monetary value.

With further reference to FIG. 3, the payment device 540 can be a payment acceptor 334 including a note, ticket, card, credit card, debit card, player card, and/or bill acceptor wherein the player inserts digital money, credits, paper money, a ticket, or voucher. In various examples, the payment device 540 can be a reader or validator for credit cards, debit cards, and/or credit slips can accept payment.

In various examples, with reference to FIGS. 5, the gaming system 500 can include one or more input devices 542 in communication with the processor 510. The input device 542 can be used for players to make various selections. The input device 542 can be arranged in various manners and locations. The input device 542 can include placing bets or making selections in a card game. The input device(s) 542 can include any suitable device which enables the player to produce an input signal which is received by processor 510 (e.g., buttons on a touchscreen, physical buttons, sensors, and/or the like, such as the buttons included on gaming machine 300 discussed herein).

In various examples, gaming system 500 can further include one or more communication ports 560 for enabling communication of the processor with external peripherals, such as external video sources, expansion buses, game or other displays, a SCSI port, or a keypad.

In various examples, the processor 510 can be in communication with the one or more display screens 544. The display screens 544 can be implemented through a gaming machine 300. The display screens 544 can include the display screens 310 and 320 of the gaming machine 300, which can display a GUI for playing a game. The display screen 544 can be connected or mounted to the cabinet of the gaming machine 300. The display screen 544 can be a display screen on a personal device, such as on a PDA, mobile device (e.g., a smartphone), or tablet, that enables play of at least a portion of a game at a location remote from gaming machine 300 and/or other gaming system.

In various examples, the display screen 544 can include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In various examples, as described in more detail herein, a display screen can include a touchscreen with an associated touch-screen controller. The display screens 544 can be of any suitable size and configuration, such as a square, rectangle, elongated rectangle, oval, etc. The display screen 544 can be configured to display at least one game and associated digital cards, images, symbols, and indicia such as any visual representation or exhibition of the movement of objects such as playing cards and the like. In various examples, the display screen 544, and display screens 310 and 320, can be divided into one or more screens, windows, or sub-display screens, to display one or more games, symbols, graphics, or other images/information.

In various examples, with reference to FIGS. 3 and 5, gaming system 500 can include a sound generating device controlled by one or more sounds cards 548 which function in conjunction with processor 510. In various examples, the sound generating device can include at least one speaker 550 (e.g., speakers 350 of gaming machine 300) or other hardware and/or software for generating sounds, such as by playing music for a game(s), or by playing music for other modes of gaming machine 300, such as an attract mode. In various examples, gaming machine 300 can provide dynamic sounds coupled with attractive multimedia images displayed on one or more of the display screens 544 to provide an audio-visual representation or to otherwise display full-motion video with sound to attract players to gaming machine 300. During idle periods, the gaming machine 300 can display a sequence of audio and/or visual attraction messages to attract potential players to gaming machine 300. The videos can also be customized to provide any appropriate information.

In various examples, as discussed herein, gaming system 500 can be implemented on a personal or user device such as a smartphone, tablet, computer, and/or the like. The components and functionality of gaming system 500 can be implemented via an application (e.g., a mobile application)

downloaded to the user device, such that the processor of the gaming system 500 and/or user device displays and operates the game for the user.

With reference to FIG. 4, a graphical user interface (GUI) 400 is depicted, in accordance with various examples. A GUI 400 may be displayed by a processor (e.g., processor 510) on a display screen (e.g., display screen 310 and/or display screen 544). A game, in accordance with various examples, can be displayed on GUI 400. In various examples, the display screen can be a touchscreen. The display screen displaying GUI 400 can include without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism.

In various examples, the GUI 400 can display digital components of a game similar to the physical components described in relation to game system 50 in FIG. 1 (e.g., components of the game displayed on GUI 400 can be digital representations or examples of the physical components of game 50 in FIG. 1). In various examples, the GUI 400 can comprise a card stack 410. In various examples, GUI 400 can comprise a dealer card zone 420, a hit card space 430, a player card zone 450, a bet zone 460, a plurality of hit zones 472, 474, 476, a plurality of bet buttons 422, 424, 426, 428, and a player information zone 480.

GUI 400 can include card stack 410 (e.g., a digital example of card stack 110 in FIG. 1). The card stack 410 can be displayed on the GUI 400. In various examples, card stack 410 can be in digital communication with a processor-based card stack 410. In various examples, card stack 410 can be hidden from the screen of GUI 400. In various examples, the card stack 410 can be configured to include a standard deck of cards or other variants. The card stack 410 can comprise two (2) or more digital decks of cards. The card stack 410 can be used to display or deal cards to different areas of the GUI 400. The dealer card zone 420 (e.g., a digital example of dealer card zone 120 in FIG. 1) can be configured to receive digital cards from the card stack 410. In various embodiments, the GUI 400 can be in communication with a processor (as described in FIG. 5), configured to deal or present the cards from the card stack 410 to suitable areas, zones, or spaces on GUI 400, e.g., to the dealer card zone 420, the hit card space 430 (e.g., a digital example of hit card space 130 in FIG. 1), and the player card zone 450 (e.g., a digital example of player card zone 150 in FIG. 1). The dealer card zone 420, the hit card space 430, and the player card zone 450 can receive cards from the card stack 410.

In various examples, the dealer card zone 420, the hit card space 430, the player card zone 450, and the bet zone 460 can be visible on the GUI 400 at different points in the gameplay. In various embodiments, the dealer card zone 420 can be proximate and/or adjacent to the hit card space 430.

In various examples, the hit card space 430 can include a first hit card space 432, a second hit card space 434, and a third hit card space 436. The hit card space 430 can be proximate and/or adjacent to the dealer card zone 420 (e.g., there are no other components displayed on the GUI 400 between dealer card zone 420 and hit card space 430). The hit card space 430 can be configured to receive one or more hit cards from the card stack 410. For example, the hit card space 430 can include a first hit card space 432, a second hit card space 434, and a third hit card space 436, wherein each of the first hit card space 432, a second hit card space 434, and a third hit card space 436 can be configured to receive a hit card from the card stack 410. In various examples, hit card space 430 can be an open and/or single space to receive hit cards in any suitable number or arrangement. In various examples, the cards placed in the hit card space 430 can be presented face-down (i.e., with the respective number or value of each hit card being hidden from a player's view).

With continued reference to FIG. 4, in various examples, the player card zone 450 can be proximate to the one or more bet zones 462, 464, 466 (e.g., digital examples of bet zones 162, 164, and 166, respectively, in FIG. 1). The plurality of hit zones 472, 474, and 476 (e.g., digital examples of hit zones 172, 174, and 176, respectively, in FIG. 1) can be proximate to the one or more bet zones 462, 464, 466. The one or more bet zones 462, 464, 466 can be in closer proximity to the player card zone 450 than the plurality of hit zones 472, 474, and 476.

In various examples, the player card zone 450 can be proximate to the hit card space 430. The player card zone 450 can include the player's hand of cards digitally displayed on the GUI 400. The player card zone 450 can receive cards from the card stack 410 and/or the hit card space 430. The GUI 400 can be configured to display the cards in the player card zone 450 faceup. The player card zone 450 can be configured to receive two cards from the card stack 410 and one or more cards from the hit card space 430. For example, the GUI 400 can display at least two original hit cards in the hit card space 430. As another example, a card is displayed in each of the first hit card space 432, the second hit card space 434, and the third hit card space 436. For example, when a player elects to receive a hit card, a hit card is digitally displayed on the GUI 400 in each of the first hit card space 432, second hit card space 434, and third hit card space 436.

With continued reference to FIG. 4, in various examples, the GUI 400 can include a plurality of hit zones 472, 474, and 476. For example, the plurality of hit zones 472, 474, and 476 can include a first hit zone 472, a second hit zone 474, and a third hit zone 476. In various examples, the first hit zone 472, the second hit zone 474, and the third hit zone 476 can be arranged in a substantially linear arrangement. For example, the first hit zone 472, the second hit zone 474, and the third hit zone 476 can each have a center point, the center point of each of the first hit zone 472, the second hit zone 474, and the third hit zone 476 can be along a line. In various examples, the first hit zone 472, the second hit zone 474, and the third hit zone 476 can be arranged in a staggered positioning (e.g., similar to hit zones 272, 274, and 286 in FIG. 2).

In various examples, the position of each of the hit zones 472, 474, and 476 correspond with a respective the hit card spaces 432, 434, 436. The plurality of hit zones 472, 474, 476 can be proximate and/or adjacent to the bet zone 460. In various examples, a player can indicate one of the plurality of hit zones 472, 474, 476 to select a hit card to receive from the hit card spaces 432, 434, 436. For example, in various examples, a player can select the first hit zone 472, then the player can receive the hit card from the first hit card space 432. The hit card from the first hit card space 432 can then be moved to the player card zone 450 (or otherwise assigned to the player and/or the player's hand), and/or the value of the selected hit card can be revealed (e.g., turned from facedown to faceup). In various examples, a first hit card space 432 can correspond to a first hit zone 472, a second hit card space 434 can correspond to a second hit zone 474, and a third hit card space 436 can correspond to a third hit zone 476.

With continued reference to FIG. 4, in various examples, the GUI 400 can include a hit button 422, a stay button 424, a double button 462, and a split button 428. In various examples, hit button 422, stay button 424, double button 426, and split button 428 can be physical buttons, or electronic or touchscreen buttons on a digital display. For example, a player can tap, press, waive, point to, place a hand or finger over the GUI 400 to indicate a selection. In various examples, hit button 422, stay button 424, double button 426, and split button 428, can be a touchscreen button on the display screen, or another visual indicator (e.g., for indicating selection of a corresponding button on a game system). In various examples, the hit button 422, stay button 424, double button 426, and split button 428 can be arranged and/or positioned in any suitable manner on the GUI 400. In various embodiments, a hit button 422 can be selected where a player wants to receive a hit card. In response to selection of the hit button, at least two hit cards can be presented the GUI in the hit card space facedown from which the player may select.

In various examples, the GUI 400 can include a player information zone 480. The player information zone 480 can display various information related to the player, including the current credit balance, time played, amount wagered, etc.

With additional reference to FIG. 3, GUI 400 can be included in the gaming machine 300 and displayed on a display screen comprised therein (e.g., display screens 310 and/or 320).

The game systems and methods discussed herein, in various examples, can be implemented on a gaming machine 300. In various examples, the gaming machine 300 can have a support structure, housing, or cabinet which provides support for a plurality of displays, inputs, controls, and other features of a conventional gaming machine. The gaming machine 300 can have a base or stand or can be a table-top game.

In various examples, the gaming machine 300 can include a display screen 310. The display screen 310 can display games (e.g., card games) and various information related to the game(s) (e.g., the game comprised in GUI 400). The display screen 310 can be preferably connected to or mounted on the cabinet of gaming machine 300. In various examples, gaming machine 300 can include a credit display which displays a player's current number of credits, cash, account balance, or the equivalent. In various examples, gaming machine 300 can include a bet display which displays a player's amount wagered. In various examples, gaming machine 300 can include player tracking display 320 which displays information regarding a player's play tracking status. In various examples, at least one display screen can be a mobile display screen, such as a PDA or tablet PC, that enables play of at least a portion of a game at a location remote from gaming machine 300.

In various examples, the display screens 310 and 320 can include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In various examples, as described in more detail below, the display screen can include a touchscreen with an associated touch-screen controller. The display screens can be of any suitable size and configuration, such as a square, rectangle, elongated rectangle, oval, etc.

In various examples, the display screens 310 and 320 can be configured to display a game and associated images, symbols, and indica such as a card game. The display screen 310 and/or the player tracking display 320 can be divided into one or more screens or sub-display screens or windows within the display screens, to display other images or information.

With continued reference to FIG. 3, the gaming machine 300 can include bet selection button 312, hit button 322, stay button 324, double button 326, split button 328, first hit button 342, second hit button 344, third hit button 346, and cash-out button 336. In various embodiments, bet selection button 312, hit button 322, stay button 324, double button 326, split button 328, first hit card button 342, second hit card button 344, third hit card button 346, and/or cash-out button 336 can be physical buttons, push sensors, heat sensors, motion sensors, electronic sensors, physical push buttons, digital buttons or touch screen buttons on a digital display, and/or other device or area to indicate a selection and provide an input to a processor. For example, a player can tap, press, touch waive, point to, and/or place a hand or finger over an elected button to indicate a selection. In various examples, bet selection button 312, hit button 322, stay button 324, double button 326, split button 328, first hit card button 342, second hit card button 344, third hit card button 346, and cash-out button 336 can be a touch sensor on the display screen 310 or display screen 320 (e.g., with reference to GUI 400 in FIG. 4, in various examples, hit button 422, stay button 424, double button 426, and split button 428 can be digital buttons on a touchscreen).

In various examples, the gaming machine 300 can comprise one or more bet selection buttons 312. The plurality of bet selection buttons 312 can include a main bet button, a first side bet button, and a second side bet button. There can be multiple bet selection buttons for multiple bets. The bet selection button 312 can also be a touch screen input on the display screen 310 or 320. In various examples, a player can select a bet selection button 312 to select, increase, and/or decrease a bet or wager.

In various examples, the button on a gaming machine (e.g., the button discussed herein) can be arranged and/or positioned in any suitable manner. In various examples, a hit button 322 can be selected in response to a player wanting to receive a hit card. The hit button can activate the processor to display or present at least two hit cards (facedown) on the display screen 310 or display screen 320.

In various examples, the gaming machine 300 can include a plurality of hit card buttons 342, 344, and 346. For example, the plurality of hit card buttons 342, 344, and 346 can include a first card hit button 342, a second hit button 344, and a third hit button 346. In various examples, the plurality of hit card buttons 342, 344, and 346 correspond to one of the hit card displayed in a GUI (e.g., GUI 400), for example, presented on display screen 310. For example, first hit card button 342 can correspond (e.g., spatially) to first hit card space 432 in GUI 400 (both the left-most items), second hit card button 344 can correspond to second hit card space 434 in GUI 400 (both the middle items), and third hit card button 346 can correspond to third hit card space 436 in GUI 400 (both the right-most item). Accordingly, selection first hit card button 342 can result in the player receiving the hit card from first hit card space 432, selection second hit card button 344 can result in the player receiving the hit card from second hit card space 434, and/or selection third hit card button 346 can result in the player receiving the hit card from third hit card space 436.

With continued reference to FIG. 3, in various examples, the gaming machine 300 can include a payment acceptor 334. The payment acceptor 334 can include a note, ticket, card, and/or bill acceptor, wherein the player inserts paper money, a ticket, or voucher, and/or a coin slot where the player inserts money, coins, or tokens. The payment acceptor 334 can accept a physical item associated with a monetary value and can establish or increase a credit balance for the player based on the monetary value. In various examples, the payment acceptor 334 can include readers or validators for credit cards, debit cards, and/or credit slips that can accept payment.

In various examples, the gaming machine 300 can be a cash-out button 336. The player can select the cash-out button 336 and initiate a "cash-out" operation to receive a cash payment or other suitable form of payment corresponding to the number of remaining credits. In various examples, in response to the player selecting a cash-out button 336, a payment device, such as a ticket, payment, or note generator prints or otherwise generates a ticket or credit slip to provide to the player. The player receives the ticket or credit slip and can redeem the value associated with the ticket or credit slip via a cashier (or other suitable redemption system).

In various examples, the gaming machine 300 can comprise one or more speakers 350. The speakers 350 can be configured to provide audio as part of a game, music, and/or the like.

In various examples, the gaming machine 300 can be in communication with a data network or internet network. The operation of gaming machine 300 can be viewed with an internet browser operating on a user device or another suitable computer. In various examples, operation of gaming machine 300 and accumulation of credits can be accomplished with only a connection to the casino management system through a conventional phone or other data transmission line, cell phone tower, digital subscriber line (DSL), T-1 line, coaxial cable, fiber optic cable, or other suitable connection. Players can access an internet game page from any location where an internet connection and computer or other internet facilitator is available.

Figure 6:
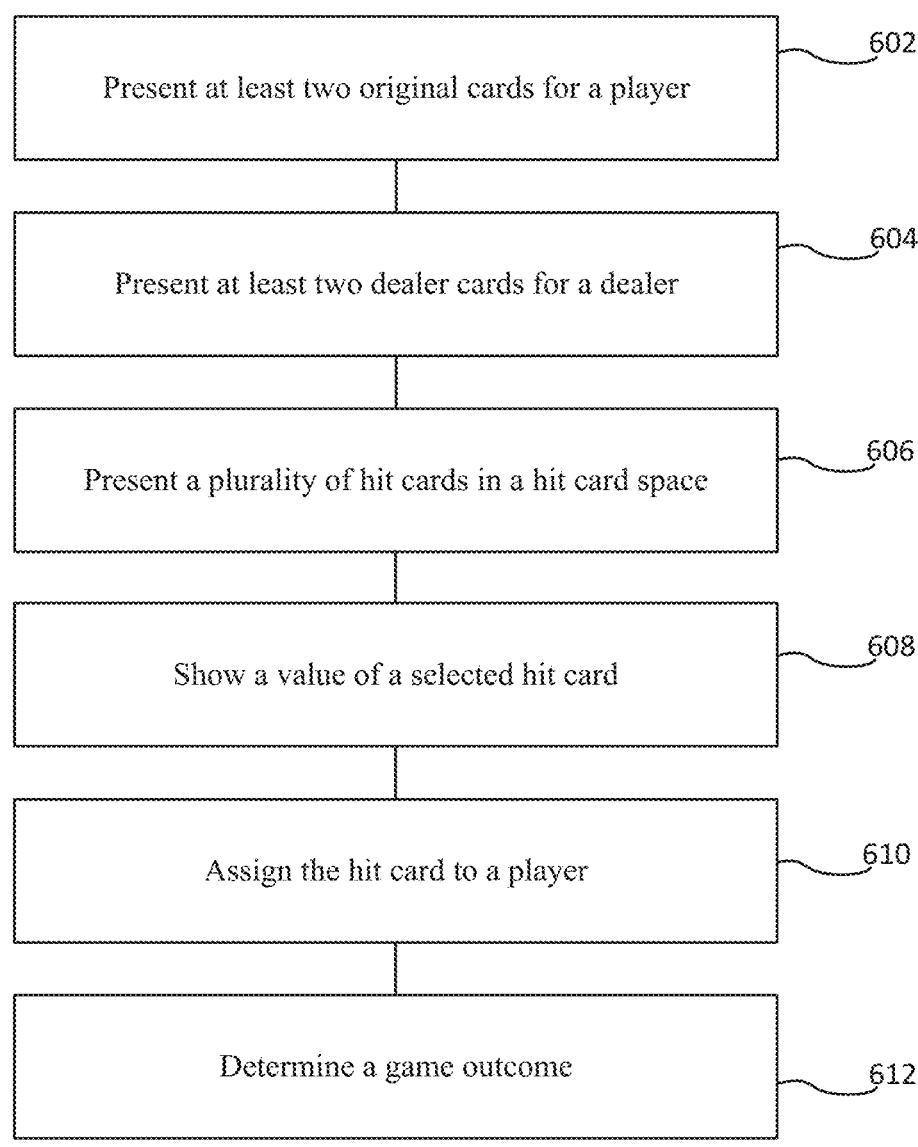
FIG. 6 illustrates a method for playing a game, in accordance with various examples.

In accordance with various examples, FIG. 6 depicts a method 600 for playing a game. With combined reference to FIGS. 1 and 6, a method 600 for playing a card game can be performed on a physical game system, e.g., game system 50. A dealer can present (i.e., deal) at least two original cards to a player (step 602). In various examples, the dealer can present the two original cards to a player by displaying the two original cards in the player card zone 150. In various examples, the dealer at a table 100 can present the two original player cards by moving cards from the card stack 110 to the player card zone 150. The original cards to each player may be displayed faceup so the values of the cards are known.

In various examples, the dealer can present at least two dealer cards to a dealer (step 604). In various examples, the dealer can present at least two dealer cards to a dealer by displaying the two dealer cards in a dealer card zone 120. The two dealer cards can be moved from the card stack 110 to the dealer card zone 120. In various examples, the dealer cards can be displayed facedown in the dealer card zone 120. In various examples, a first dealer card can be displayed face down in the dealer card zone 120 and a second dealer card can be displayed faceup in the dealer card zone 120.

In various examples, the dealer can present a plurality of hit cards in a hit card space 130 (step 606). For example, the dealer can place a first hit card in a first hit card space 132, a second hit card in a second hit card space 134, and a third hit card in a third hit card space 136. In various examples, the plurality of hit cards can be placed face-down, hiding a value of each of the plurality of hit cards. Hit cards can be disposed in the hit card space 130 automatically in response to the original player and dealer cards being dealt or presented, or the hit cards can be presented in the hit card space 130 in response to a player indicating that they would like to receive a hit card.

The hit cards are available for a player to receive as a hit and increase the value of their hand. In various embodiments, the dealer can show a value of a selected hit card (step 608). In various examples, a dealer can show a value of a first hit card of the plurality of hit cards in response to a player selecting the first hit card. In various examples, a player can select a first hit card can by selecting from the plurality of hit zones. For example, a player can select a hit zone by tapping or touching the selected hit zone or otherwise indicating such hit zone in order to select a hit card corresponding to that hit zone. As another example, wherein hit zones can comprise hit sensors, to select the hit zone and the respective hit card, the player can activate the hit sensor (e.g., by pressing a button, touching heat or press sensor, waving over a motion sensor, and/or the like). In various examples, a gaming table can comprise a light or other visual indicator associated with each hit zone. The light of the selected hit zone can illuminate, or the visual indicator can otherwise indicate, selection of the hit zone, which can convey to the dealer the selected hit zone and the corresponding hit card which will become part of the player's hand.

In various examples, the gaming table can comprise a plurality of hit zones in each player zone. In various examples, each hit zone can be associated with a respective hit card of the plurality of hit cards and positioned corresponding to the respective hit card. For example, a first hit zone can correspond to a first hit card that is presented in a first hit card space or position, a second hit zone can correspond to a second hit card that is presented in a second hit card space or position, and a third hit zone can correspond to a third hit card that is presented in a third hit card space or position. In various examples, the first hit card can be selected by the player by indicating a first hit zone of the plurality of hit zones associated with the first hit card.

In response to a hit card being selected and its value shown, in various embodiments, the selected hit card can be assigned to the respective player (step 610) and their hand. The player can decide to hit (or not), and can decide how many times to hit to receive additional hit cards, until staying with the present cards or busting (having a total of over 21, or another threshold number). The process of a player receiving additional hit cards can be repeated as discussed herein to receive additional hit cards. For example, in various examples, after selection of a hit card, the number of hit cards original presented facedown is replenished between hits. As another example, the number of hit cards available to the player decreases with each selection of a hit card (i.e., hit cards are not replaced after selection) until additional hit cards are simply taken from the card stack. As another example, after each hit card selection, the remaining presented hit cards are discarded, and a new set of hit cards are presented facedown. When changing players, the hit cards available to the next player can remain the same, be replenished to the original number of presented hit cards, or the remaining hit cards can be discarded and a new set of hit cards can be presented facedown.

In various examples, in response to all players completing their turns, the dealer can conduct a turn. The dealer can reveal the value of both of the dealer cards and either hit or stay. For example, the dealer can hit if the dealer hand totals less than a threshold number (e.g., 16), and must continue to hit until the dealer hand exceeds that threshold or the dealer busts.

In response to the player receiving hit cards or staying, and/or in response to completion of the dealer turn, a game outcome can be determined (step 612). The game outcome can be determined based on the at least two original cards and/or any hit cards received by the player. For example, in response to the player having a hand value of 21 with the first two original player cards, the outcome is that the player may win if the dealer does not have a hand equal to 21. In response to the player selecting and receiving one or more hit cards, and the player's hand exceeding a threshold value (e.g., 21), the outcome is that the player loses. In response to the player having a total card value of less than the threshold (e.g., 21) and the dealer having a total card value of greater than the threshold value, the outcome is that the player wins. In response to the player and the dealer both having a total card value of less than the threshold (e.g., 21), the outcome is that the higher total value hand wins.

In response to determining the game outcome, winnings are paid in accordance with known wagering and odds, e.g., in accordance with those payouts discussed herein.

Figure 7:
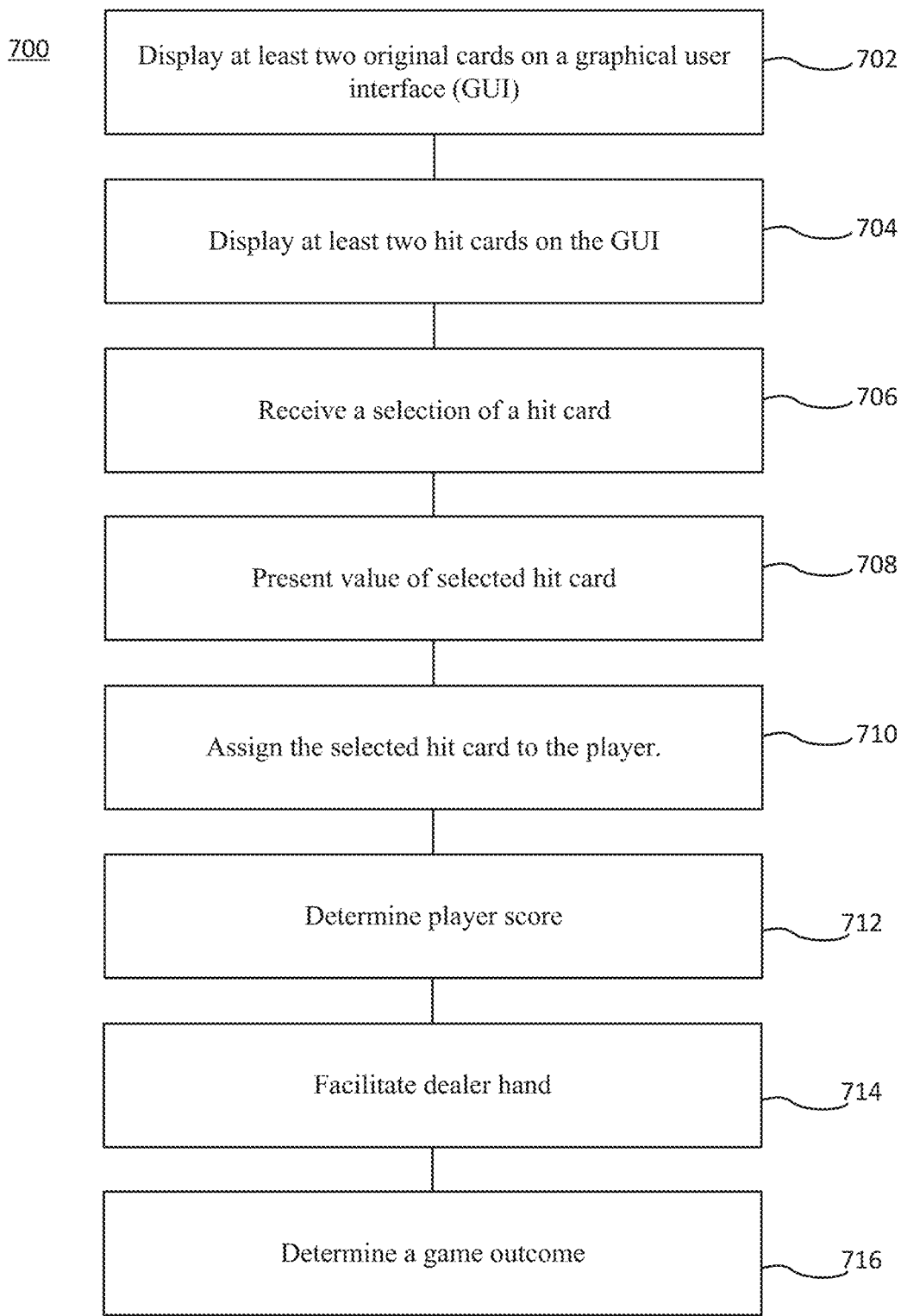
FIG. 7 illustrates a method for playing a game on a gaming device, in accordance with various examples.

In accordance with various examples, FIG. 7 depicts a method 700 for playing a game on a gaming device (or operating a gaming system or machine). With combined reference to FIGS. 3, 4, and 7, a digital card game, in accordance with various examples, can be offered on any suitable gaming device, such as gaming machine 300, a personal device (e.g., a smart phone, tablet, a personal computer), and/or the like. The game can be presented to the player on a display screen (e.g., display screen 310) via a GUI (e.g., GUI 400). A processor (e.g., processor 510) can be operably connected to the gaming device and facilitate or cause various operations to occur. In various examples, a tangible non-transitory memory (e.g., memory 520) can be in communication with the processor and can have instructions stored thereon. The instructions can cause the processor to perform, or facilitate the performance of, various operations (e.g., the steps of method 700).

In various examples, at least two original cards (e.g., digital cards) can be displayed on a GUI (step 702). The at least two original cards can be assigned to a player. In various embodiments, the two digital original cards can be displayed in the player card zone 450 of the GUI 400. In various examples, the original cards can be displayed on the GUI faceup, so that their respective values are displayed.

In various examples, at least two dealer cards can be displayed on the GUI and assigned to the dealer (or other digital representation of the house or casino, against whom the player is playing). One or more of the dealer cards can be faceup, and one or more of the dealer cards can be facedown.

In various examples, at least two hit cards can be displayed on the GUI (step 704). The two digital hit cards can be displayed in the hit card space of the GUI. For example, a first digital hit card can be displayed in a first hit card space, and a second digital hit card can be displayed in the second hit card space. In various examples, a third hit card can be displayed in a third hit card space. In various examples, the at least two digital hit cards can be displayed facedown in the hit card space so that the value of the at least two digital hit cards is hidden. Hit cards can be displayed on the GUI (e.g., in the hit card space) automatically in response to the original player cards being displayed and/or assigned, or the hit cards can be displayed on the GUI in response to receiving an input from the player that the player would like to hit (i.e., receive another card). For example, in response to the player selecting a hit button (e.g., hit button 322 and/or 422), the hit cards can be displayed on the GUI.

In various examples, the processor can receive a selection of a hit card (step 706). In various examples, the processor can receive a selection of a digital hit card by a player selecting a hit button or sensor. For example, a player can select a hit sensor and can receive a digital hit card corresponding with that hit sensor. For example, a player can select first hit button 342, and in response, the processor will receive the corresponding input indicating the player's hit card selection. In response, the player can receive the hit card in first hit card space 432. In various embodiments, a processor can present a value of the selected digital hit card (step 708). For example, the processor can present the value of a hit card on the GUI by displaying it on the display screen. In various embodiments, the selected digital hit card (and its value) can be assigned to the player (step 710). For example, the processor can assign the hit card to the player card zone. In response to the selected hit card being assigned to the player and/or the selected hit card value being presented, a player score can be determined (step 712). The player score can be the total value of all cards assigned to the player (e.g., the original cards and any selected hit cards).

The player can continue to take hit cards until the player's total score goes above a threshold value (e.g., 21), or the player elects to stay with the current cards in their hand. In taking subsequent hit cards, as discussed herein, the player can be required to select from the remaining hit cards presented, the hit cards can be replenished to the original number presented, and/or the remaining hit cards can be discarded, and a new set of hit cards can be presented for selection therefrom.

In various examples, in response to a player indicating that they would like to stay with the current cards in their hand (e.g., by selecting stay button 424), the processor can facilitate a hand for the dealer (step 714), e.g., as described herein. For example, a total value of the dealer's original cards can be determined. In response to the dealer's cards totaling less than 16 or 17 (or some other threshold value), the dealer can be assigned a hit card (e.g., from the card stack). In response to each hit card being assigned, the processor can determine a new total value of the dealer's cards, and repeat the process until the dealer exceeds a threshold value (e.g., 16 or 17, or 21).

In response to concluding the dealer's hand, and/or in response to the player's hand exceeding a threshold value (e.g., busting), a game outcome can be determined (step 716). The game outcome can be determined based on the at least two original cards and/or any hit cards received by the player, and/or the original cards and any hit cards received by the dealer. For example, in response to the player having a hand value of 21 with the first two original player cards, the processor can determine the outcome to be that the player may win if the dealer does not have a hand equal to 21. In response to the player selecting and receiving one or more hit cards, and the player's hand exceeding a threshold value (e.g., 21), the processor can determine the outcome to be that the player loses. In response to the player having a total card value of less than the threshold (e.g., 21) and the dealer having a total card value of greater than the threshold value, the processor can determine the outcome to be that the player wins. In response to the player and the dealer both having a total card value of less than the threshold (e.g., 21), the processor can determine the outcome to be that the higher total value hand wins.

In response to the dealer winning (i.e., the player losing), the processor may claim or take away the player's wager made before and/or during the hand. In response to the player winning the hand, the processor can apply a payout amount to the player (e.g., by causing money to be discharged from the gaming device and/or a credit applied to the player's account, card, transaction device, and/or the like).

The game systems and methods discussed herein provide multiple benefits to gaming and player experience. For example, by allowing a player to select a hit card from a plurality of hit cards, the player is able to choose between multiple options what card to add to their hand, rather than simply receiving the next card from the card stack or sleeve. Thus, the player has some control over their next hit card (though the values are hidden until selection), and thus more control over the outcome of their hand. Player experience can be further increased because the hit card selection of other players at the table may not affect the hand outcome of the subject player. Sometimes, in traditional blackjack (where players are unable to choose between multiple hit cards if they want to hit), a player at a table is inexperienced, naïve, or simply reckless in playing a hand (e.g., by taking hit cards when the odds and best practice says you should not). By taking an ill-advised hit, the troublesome player may receive a card that another player at the table needed and would have received but for the troublesome player's poor judgment. In the present disclosure, allowing players to choose between multiple hit cards (and then replenishing or replacing hit cards between players) lessens or minimizes the risk that one player's actions will affect another's. Further, blackjack dealers are often tipped better when players are winning. However, a player may blame the dealer for receiving a bad hit card, causing the player to bust or otherwise receive an undesired outcome. With the systems and methods of the present disclosure, players may be less likely to blame the dealer for an undesired hit card, because the player selected the hit card from the multiple available hit cards. Thus, the systems and methods of the present disclosure can increase dealer and/or casino employee enjoyment (e.g., by decreasing negative player-dealer interactions and/or better pay/tips).

The game and game components disclosed herein, in both physical and electronic versions, may incorporate reasonable design parameters, features, modifications, advantages, and variations that are readily apparent to those skilled in the art in the field of the game design and/or board game industry.

Without departing from the scope and spirit of the present invention, reasonable features, modifications, advantages, and design variations of the claimed invention will become readily apparent to those skilled in the art by following the guidelines set forth in the preceding detailed description and embodiments.

It is understood that although a number of different examples and embodiments of the game system described herein and corresponding method of playing the game system have been illustrated and described herein, one or more features of any one embodiment can be combined with one or more features of one or more of the other embodiments, provided that such combination satisfies the intent of the present invention.

While a number of exemplary aspects and embodiments of the game system and corresponding method of play have been discussed above, those of skill in the art will recognize certain modifications, permutations, additions and sub-combinations thereof. It is therefore intended that the following appended claims and claims hereafter introduced are interpreted to include all such modifications, permutations, additions, and sub-combinations as are within their true spirit and scope.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein relating to the system are implemented using the various particular machines described herein. The methods described herein may be implemented using particular machines discussed herein, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components of the systems discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

In fact, in various examples, various examples are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

The terms "computer program medium" and "computer usable medium" and "computer readable memory" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

As those skilled in the art will appreciate, a device (e.g., a gaming machine or gaming device) includes an operating system (e.g., WINDOWS®/CE/Mobile, OS2, UNIX®, LINUX®, SOLARIS®, MacOS, etc.) as well as various conventional support software and drivers typically associated with computers. A device may include any suitable personal computer, network computer, workstation, personal digital assistant, cellular phone, smart phone, minicomputer, mainframe or the like. A device can be in a home or business environment with access to a network. In various embodiments, access is through a network or the Internet through a commercially available web-browser software package. A device may implement security protocols such as Secure Sockets Layer (SSL) and Transport Layer Security (TLS). A device may implement several application layer protocols including http, https, ftp, and sftp.

The systems and methods may be described herein in terms of functional block components, screen shots, optional selections and various processing steps. It should be appreciated that, relating to the system (e.g., system 500), such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements.

Various systems and methods described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gaming system comprising:

a gaming machine comprising a display screen;

a processor operably connected to the gaming machine; and a tangible non-transitory computer readable memory configured to communicate with the processor, the tangible non-transitory computer readable memory having instructions stored thereon that, in response to execution by the processor cause the processor to perform operations comprising:

displaying, by the processor, at least two digital original cards assigned to a player on a graphical user interface (GUI) displayed on the display screen, with each of the at least two digital original cards displaying a respective value;

displaying, by the processor, at least two digital hit cards on the GUI, wherein the at least two digital hit cards are presented hiding respective values of the at least two digital hit cards;

receiving, by the processor, a selection of a first digital hit card of the at least two digital hit cards;

presenting, by the processor, the first digital hit card to show a first digital hit card value associated with the first digital hit card in response to receiving the selection of the first digital hit card; and assigning, by the processor, the first digital hit card to the player.

2. The system of claim 1, further comprising at least two hit buttons, wherein each hit button of the at least two hit buttons is associated with a hit card of the at least two digital hit cards, wherein the selection of the first hit card occurs in response to a selection of a first hit button of the at least two hit buttons.

3. The system of claim 1, wherein the operations further comprise:

determining, by the processor, a player score based on the respective values of the at least two digital original cards and the first digital hit card.

4. The system of claim 1, wherein the operations further comprise:

receiving, by the processor, a second selection of a second digital hit card of the at least two digital hit cards;

presenting, by the processor, the second digital hit card to show a second digital hit card value associated with the second digital hit card; and assigning, by the processor, the second digital hit card to the player.

5. The system of claim 2, wherein the first hit button is positioned on the gaming machine in a first button position corresponding with a position of the first digital hit card displayed on the GUI, and wherein a second hit button of the at least two hit buttons is positioned on the gaming machine in a second button position corresponding with a position of the second digital hit card displayed on the GUI.

6. The system of claim 1, further comprising a random number generator configured to randomize digital cards presented by the processor based on a standard 52-card deck.

7. The system of claim 6, wherein, at least one of:

the at least two digital original cards and the at least two digital hit cards are randomly selected using the random number generator; or a value of each of the at least two digital original cards and the at least two digital hit cards are randomly assigned using the random number generator.

8. A method of operating a gaming device, comprising:

displaying, by a processor, at least two digital original cards assigned to a player on a graphical user interface (GUI) displayed on a display screen, with each of the at least two digital original cards displaying a respective value;

displaying, by the processor, at least two digital hit cards on the GUI, wherein the at least two digital hit cards are presented hiding values of the at least two digital hit cards;

receiving, by the processor, a selection of a first digital hit card of the at least two digital hit cards;

presenting, by the processor, the first digital hit card to show a first digital hit card value associated with the first digital hit card in response to receiving the selection of the first digital hit card; and assigning, by the processor, the first digital hit card to the player.

9. The method of claim 8, further comprising receiving, by the processor, an input from a first hit sensor, wherein the first hit sensor is associated with the first digital hit card, wherein the selection of the first digital hit card occurs in response to the input from the first hit sensor.

10. The method of claim 8, further comprising:

determining, by the processor, a player score based on the respective values of the at least two digital original cards and the first digital hit card.

11. The method of claim 8, further comprising:

receiving, by the processor, a second selection of a second digital hit card of the at least two digital hit cards;

presenting, by the processor, the second digital hit card to show a second digital hit card value associated with the second digital hit card; and assigning, by the processor, the second digital hit card to a player card zone, wherein the second hit card is assigned face-up to the player card zone.

12. The method of claim 9, wherein the first hit sensor is positioned on the gaming device in a first sensor position corresponding with a position of the first digital hit card displayed on the GUI, and wherein a second hit sensor of the at least two hit sensors is positioned on the gaming device in a second sensor position corresponding with a position of a second digital hit card displayed on the GUI.

13. The method of claim 8, further comprising selecting, by the processor and a random number generator, the at least two original cards and the at least two digital hit cards randomly.

14. The method of claim 13, further comprising selecting, by the processor and a random number generator, a value of each of the at least two original cards and the at least two digital hit cards randomly.

* * * * *